Patented Mar. 11, 1952

2,589,062

UNITED STATES PATENT OFFICE 2,589,062

OXYALKYLATED DERIVATIVES OF FURFURAL-SUBSTITUTED PHENOL RESINS

Melvin De Groote, University City, and Bernhard Keiser, Webster Groves, Mo., assignors to Petrolite Corporation, Ltd., Wilmington, Del., a corporation of Delaware No Drawing. Application January 6, 1950, Serial No. 137,295

5 Claims. (Cl. 260—53)

The present invention is concerned with certain new chemical products, compounds, or compositions having useful application in various arts.

This application is a continuation-in-part of our co-pending application Serial No. 8723, filed February 16, 1948, now Patent 2,499,366, granted March 7, 1950. Also see our co-pending application Serial No. 74,474, filed February 3, 1949. It includes methods or procedures for manufacturing said new chemical products, compounds, or compositions themselves.

Said new compositions are hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble phenol-furfural resin; said resin being derived by reaction between a difunctional monohydric phenol and furfural; said resin being formed in the substantial absence of trifunctional phenols; said phenol being of the formula:

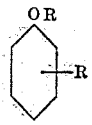

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending applicaton Serial No. 137,294, filed January 6, 1950 now Patent #2,568,115 issued September 18, 1951.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like, as germicides, insecticides, emulsifying agents, as, for example, for cosmetics, spray oils, water-repellent textile finishes, as lubricants, etc.

For purpose of convenience, what is said hereinafter will be divided into two parts. Part 1 will be concerned with the production of the resin from a mixture of the kind specified and described in greater detail subsequently, and Part 2 will be concerned with oxyalkylation of the resin so as to convert it into a hydrophile hydroxylated derivative.

PART 1

The production of resins from difunctional hydrocarbon-substituted phenols is well known and such resins are important in the art, particularly in the preparation of varnish and similar coatings. Those derived from furfural instead of formaldehyde, for example, have limitations in their use, due to the fact that furfural is apt to give a compound having a dark color. In any event, the production of such resins is conventional.

In the preparation of the resins and also in the subsequent oxyalkylation step described in Part Two, frequent reference will be made to a number of co-pending applications for purpose of reference as required.

Example 1AA

| | Grams |
|---|---|
| Para-tertiary amylphenol | 164 |
| Furfural | 96 |
| Potassium carbonate | 8 |

The equipment used was a conventional two-piece laboratory resin pot. The cover part of the equipment had four openings, one for reflux condenser, one for the stirring device, one for a separatory funnel or other means of adding reactants, and a thermometer well. The device was equipped with a combination reflux and water trap apparatus, so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The furfural was shaken with dry sodium carbonate prior to use, to eliminate any acid, etc. The procedure employed was substantially that described in detail in Technical Bulletin No. 109 of the Quaker Oats Company, Chicago, Illinois. The above reactants were heated under the reflux condenser for two hours in the same resin pot arrangement described above. As previously stated, the separatory funnel device was not employed. No xylene or other solvent was added. The amount of material vaporized and condensed was comparatively small, except for the water of reaction. At the end of this heating or reflux period the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure, using 3.2 grams of potassium carbonate instead of 8.0 grams.

For purpose of comparison, see Example 42a in our co-pending application Serial No. 82,704, filed May 21, 1949, now Patent 2,499,370, granted March 7, 1950 in which the same designation, i. e., Example 42a, is again employed to identify the same example.

Example 2AA

| | Grams |
|---|---|
| Para-tertiary amylphenol | 164 |
| Furfural (conbonate treated) | 70 |
| Potassium carbonate | 3.2 |

The procedure employed was the same as that of Example 1AA, preceding. The amount of water distilled was 10 cc. and the amount of furfural 3 cc. The resin was bright black, xylene-soluble resin, semi-pliable to hard.

See Example 43a in our co-pending application, Serial No. 82,704, filed May 21, 1949, in which the same designation, i. e., Example 43a, is again employed to identify the same example.

Example 3AA

| | Grams |
|---|---|
| Nonylphenol (1.0 mole) | 220 |
| Furfural (Na$_2$CO$_3$ treated) (1.0 mole) | 96 |
| Potassium carbonate | 12 |
| Xylene | 200 |

The furfural was shaken with dry sodium carbonate prior to use to eliminate any acids, etc., as in previous examples. The procedure employed was substantially that described in detail in Technical Bulletin No. 109 of the Quaker Oats Company, Chicago, Illinois. The materials, except the xylene, were heated under reflux condenser for 2 hours in the same resin pot arrangement described in Example 1AA. At the end of this heating or reflux period the trap was set to remove the water, and the xylene added after most of the water had distilled. The maximum temperature during and after removal of water was approximately 205° C. The resin was a reddish black resin, xylene-soluble, and semi-soft to pliable in consistency.

See Example 90a of our co-pending application, Serial No. 8,723, filed February 16, 1948, or Example 88a of Serial No. 74,474, filed February 3, 1949.

Example 4AA

| | Grams |
|---|---|
| Menthylphenol (1.0 mole) | 232 |
| Furfural (Na$_2$CO$_3$ treated) (1.0 mole) | 96 |
| Potassium carbonate | 12 |
| Xylene | 200 |

The procedure followed was the same as that in Example 1AA, preceding. The solvent-free resin was reddish black in color, hard, brittle, with a melting point of 158° to 163° C., and showed a definite tendency towards being heat-curable.

See Example 91a of our co-pending application, Serial No. 8,723, filled February 16, 1948, or Example 89a of Serial No. 74,474, filed February 3, 1949.

Example 5AA

The same procedure was followed as in Example 1AA, preceding, except that 206 parts by weight of commercial para-octylphenol replaced 164 parts by weight of para-tertiary amylphenol. In co-pending application Serial No. 74,474 this particular resin is indicated as Example 144a, and the resin previously referred to as Example 1AA is referred to as Example 42a.

Example 6AA

The same procedure was followed as in Example 1AA, preceding, except that 170 parts by weight of commercial para-phenylphenol replaced 164 parts by weight of para-tertiary amylphenol. In our co-pending application Serial No. 74,474, this resin was referred to as Example 149a, and Example 1AA was referred to as Example 42a.

Example 7AA

| | Grams |
|---|---|
| Para-tertiary butylphenol | 150 |
| Furfural (Na$_2$CO$_3$ treated) | 96 |
| Potassium carbonate | 10 |
| Xylene | 200 |

The procedure employed was the same as that in Example 1AA, preceding. The solvent-free resin was black or reddish black in color, xylene-soluble, hard and very brittle. Its melting point was between 220°–230° C. It was found to be heat-curable.

Example 8AA

This resin was made in exactly the same way as Example 1AA, except that 164 parts by weight of para-tertiary ampylphenol were replaced by 206 parts by weight of para-octylphenol. The final product had substantially the same appearance, solubility characteristics, etc., as resin Example 1AA.

Example 9AA

This resin was made in exactly the same way as Example 1AA, except that 164 parts by weight of para-tertiary amylphenol were replaced by 170 parts of commercial para-phenylphenol. The final product had substantially the same appearance, solubility characteristics, etc., has resin Example 1AA.

The resinification procedure previously described yields resins having at least 3 phenolic nuclei and usually modestly in excess thereof. In other words, an average of 4, 5 or 5½ or 6 nuclei per resin molecule.

As pointed out in our aforementioned co-pending application Serial No. 8,723, other means are available to yield resins in which there may be present a larger number of phenolic nuclei, for instance, 7 to 15. Such resins are conveniently obtained by subjecting the resin obtained in the conventional manner to further treatment under a vacuum at a temperature below the pyrolytic point of the resin. Sometimes the expression "low-stage" resin or "low-stage" intermediate is employed to mean a stage having 6 or 7 units or even less. In the appended claims we have used "low-stage" to mean 3 to 7 units, based on average molecular weight.

PART 2

Example 1BB

The resin employed was the one described under the heading of Example 1AA. 100 grams of the resin were mixed with 100 grams of xylene so as to give a 50% solution. 2% of sodium methylate, based on the solvent-free resin was added as a catalyst. The solution of the resin was placed in a small laboratory autoclave and the mixture reacted with 50 grams of ethylene oxide. During this addition the maximum temperature was 115° C., the maximum pressure was 104 pounds per square inch, and the time required to add the oxide was 2 hours. Needless to say, the mixture was stirred constantly during the reaction and the reaction considered at an end when there was no further drop in pressure, thus indicating that all the ethylene oxide present had reacted. The pressure registered on the gauge at the end of the reaction indicated the vapor pressure of xylene at the indicated temperature. As the end of this first addition there was no particular change in the solubility of the product, i. e., it was practically as insoluble as the original xylene solution of the resin. A second 50 grams of ethylene oxide were added in another 2-hour period. In this second addition the maximum temperature was 130° and the maximum pressure 95 pounds. At the end of this period the product began to show a definite tendency to emulsify.

A third 50-gram addition of ethylene oxide was then made during a one-hour period. In this particular addition the maximum temperature was 120° and the maximum pressure 96 pounds. The product at the end of this 3-hour period was entirely water-soluble.

Example 2BB

The same procedure was followed as in Example 1BB, immediately preceding, except that the resin employed was that of Example 2AA, instead of 1AA. The two initial resins were very much alike and the conditions of addition were substantially the same, i. e., 150 grams of ethylene oxide added to 100 grams of resin in three periods of 2 hours, 2 hours and one hour. The conditions under which addition of ethylene oxide was made, as far as temperature and pressure are concerned, were substantially the same as in Example 1BB, preceding. The amount of sodium methylate added was the same, and the solubility characteristics at the end of each period were substantially the same.

Example 3BB

The same reactants, and procedure were employed as in Example 1BB, preceding, except that propylene oxide was employed instead of ethylene oxide. The resultant, even on the addition of the alkylene oxide in the weight proportions of the previous example, has diminished hydrophile properties, in comparison with the resultants of Example 1BB. This illustrates the point that propylene oxide and butylene oxide give products of lower levels of hydrophile properties than does ethylene oxide.

Example 4BB

The same reactants and procedure were followed as in Example 1BB, preceding, except that one mole of glycide was employed initially per hydroxyl radical. This particular reaction was conducted with extreme care and the glycide was added in small amounts representing fractions of a mole. Ethylene oxide was then added, following the procedure of Example 1BB, to produce products of greater hydrophile properties. We are extremely hesitant to suggest even the experimental use of glycide and methylglycide, for the reason that disastrous results may be obtained even in experimentation with laboratory quantities.

Example 5BB

The same procedure was followed as in Example 1BB, preceding, except that the resin employed was the one described under the heading of Example 7AA. The amount of resin used was 100 grams, dissolved in 100 grams of xylene. 4 grams of sodium methylate were added, along with 100 grams of ethylene oxide. Due to the increased amount of catalyst the reaction time was somewhat more rapid than in Example 1AA, preceding. The reaction was complete in one-half hour. The maximum temperature employed was 150° C., and the maximum pressure 150 pounds per square inch. At the end of this period the product showed some tendency to emulsify.

The second addition of 100 grams of ethylene oxide was then made. The time required was 1⅓ hours, the maximum temperature was 150° C., and the maximum pressure 160 pounds.

The product showed definite water-emulsifiability but was not water-soluble.

The third addition of ethylene oxide was made, using another 100 grams. The maximum temperature during this period was 162° C., and the maximum pressure 165 pounds. The time required was 2¾ hours. During this third period there was a definite tendency towards rubberiness and the product seemed to be only partially soluble in xylene. The product was solubilized by the addition of the diethylether of ethylene glycol. 150 grams of this solvent were aded. The product then was a deep amber-colored, somewhat viscous liquid, which was water-soluble.

Instead of preparing resins on a laboratory scale, we have also prepared phenol-furfural resins of the kind described, in a 10 to 15-gallon electro-vapor synthetic resin pilot plant reactor. Such piece of equipment is manufactured by the Blaw-Knox Company, Pittsburgh, Pennsylvania, and is described completely in their Bulletin No. 2087, issued in 1947, with specific reference to specification No. 71,3965.

For convenience, the numbers given in the following tables are the same as the identical laboratory size batches previously described, and it is understood that they were simply stepped up in size, but otherwise made in the pilot plant equipment previously described.

The solvent used in each instance was xylene. This solvent is particularly satisfactory, for the reason that it can be removed readily by distillation or vacuum distillation. In these continuous experiments the speed of the stirrer in the autoclave was 250 R. P. M.

In the subsequent tables it will be noted that if a comparatively small sample is taken at each stage, for instance, one-half to one gallon, one can proceed through the entire molal stage of one to one, to one to twenty, without remaking at any intermediate stage. However, in most cases, we found it desirable to take a larger sample, for instance, a 3-gallon sample, at an intermediate stage. As a result, it was necessary in such instances to start with a new resin sample in order to prepare sufficient oxyethylated derivatives illustrating the latter stages. Under such circumstances, of course, the earlier stages which had been previously prepared were by-passed or ignored. This is illustrated in the tables, where, obviously, it shows that the starting mix was not removed from a previous sample. Such pilot plant size resin pot is adapted to operate under pressure; and provided the resin permits a working pressure of 200 pounds or thereabouts, resinification and oxyalkylation can take place in the same piece of equipment. We have repeatedly used equipment for this dual purpose.

In order to do what we have stated previously, i. e., preserve reference to our co-pending application Serial No. 74,474, filed February 3, 1949, we are presenting the same data which appears therein in verbatim form, adding only one thing to identify the resin in the instant case.

*Phenol for resin: Para-tertiary amylphenol    Aldehyde for resin: Furfural*

Date, August 27-31, 1948

[Resin made on pilot plant size batch, approximately 25 pounds, corresponding to 42a but this batch designated as 134a.]

| Resin 1AA | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 6BB* | | | | | | | | | | | | | | | | |
| *First Stage* | | | | | | | | | | | | | | | | |
| Resin to EtO Molal Ratio 1:1. Ex. No. 134b | 11.2 | 18.0 | ------ | 11.2 | 18.0 | 3.5 | 2.75 | 4.4 | 0.85 | 8.45 | 13.6 | 2.65 | 120 | 135 | ¼ | Not soluble. |
| *Ex. 7BB* | | | | | | | | | | | | | | | | |
| *Second Stage* | | | | | | | | | | | | | | | | |
| Resin to EtO Molal Ratio 1:5. Ex. No. 135b | 8.45 | 13.6 | 2.65 | 8.45 | 13.6 | 12.65 | 5.03 | 8.12 | 7.55 | 3.42 | 5.48 | 5.10 | 110 | 150 | ¼ | Somewhat soluble. |
| *Ex. 8BB* | | | | | | | | | | | | | | | | |
| *Third Stage* | | | | | | | | | | | | | | | | |
| Resin to EtO Molal Ratio 1:10. Ex. No. 136b | 4.5 | 8.0 | ------ | 4.5 | 8.0 | 14.5 | 2.45 | 4.35 | 7.99 | 2.05 | 3.65 | 6.60 | 180 | 163 | ½ | Soluble. |
| *Ex. 9BB* | | | | | | | | | | | | | | | | |
| *Fourth Stage* | | | | | | | | | | | | | | | | |
| Resin to EtO Molal Ratio 1:15. Ex. No. 137b | 3.42 | 5.48 | 5.10 | 3.42 | 5.48 | 15.10 | ------ | ------ | ------ | ------ | ------ | ------ | 180 | 188 | ¼ | Very soluble. |
| *Ex. 10BB* | | | | | | | | | | | | | | | | |
| *Fifth Stage* | | | | | | | | | | | | | | | | |
| Resin to EtO Molal Ratio 1:20. Ex. No. 138b | 2.05 | 3.65 | 6.60 | 2.05 | 3.65 | 13.35 | ------ | ------ | ------ | ------ | ------ | ------ | 120 | 125 | ¼ | Very soluble. |

Resin is 1AA. Reference to 42a and 134a is for comparison with Serial No. 74,474, filed Feb. 3, 1949. This is true also in regard to reference to Ex. 134b to 138b, inclusive. These 5 examples in the present case are, as noted, Examples 6BB through 10BB, inclusive.

Date, October 13-15, 1948     Phenol for resin: Para-nonylphenol     Aldehyde for resin: Furfural

[Resin made on pilot plant size batch, approximately 25 pounds, corresponding to 88a but this batch designated as 154a].

| Resin 3AA | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 11BB* *First Stage* Resin to EtO Molal Ratio 1:1 Ex. No. 154b | 10.85 | 20.75 | ------ | 10.85 | 20.75 | 3.0 | 2.57 | 4.90 | 0.73 | 8.28 | 15.85 | 2.27 | 100 | 150 | ⅓ | Insoluble. |
| *Ex. 12BB* *Second Stage* Resin to EtO Molal Ratio 1:5 Ex. No. 155b | 8.28 | 15.85 | 2.27 | 8.28 | 15.85 | 11.77 | 3.82 | 7.33 | 5.45 | 4.46 | 8.52 | 6.32 | 100 | 182 | ⅙ | Slight tendency toward becoming soluble. |
| *Ex. 13BB* *Third Stage* Resin to EtO Molal Ratio 1:10 Ex. No. 156b | 5.95 | 11.35 | ------ | 5.95 | 11.35 | 16.75 | 3.38 | 6.42 | 9.50 | 2.57 | 4.93 | 7.25 | 100 | 181 | ½ | Fairly soluble. |
| *Ex. 14BB* *Fourth Stage* Resin to EtO Molal Ratio 1:15 Ex. No. 157b | 4.46 | 8.52 | 6.32 | 4.46 | 8.52 | 19.07 | ------ | ------ | ------ | ------ | ------ | ------ | 90 | 188 | ⅓ | Readily soluble. |
| *Ex. 15BB* *Fifth Stage* Resin to EtO Molal Ratio 1:20 Ex. No. 158b | 2.57 | 4.93 | 7.25 | 2.57 | 4.93 | 14.50 | ------ | ------ | ------ | ------ | ------ | ------ | 100 | 160 | ⅓ | Quite soluble. |

Resin is 3AA. Reference to 88a and 154a is for comparison with Serial No. 74,474, filed Feb. 3, 1949. This is true also in regard to reference to Ex. 154b to 158b, inclusive. These 5 examples in the present case are, as noted, Examples 11BB through 15BB, inclusive.

Date, September 23-24, 1948     Phenol for resin: Menthyl phenol     Aldehyde for resin: Furfural

[Resin made on pilot size batch, approximately 25 pounds, corresponding to 89a, but this batch designated as 139a.]

| Resin 4AA | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 16BB* *First Stage* Resin to EtO Molal Ratio 1:1 Ex. No. 139b | 10.25 | 17.75 | ------ | 10.25 | 17.75 | 2.5 | 2.65 | 4.60 | 0.65 | 7.6 | 13.15 | 1.85 | 90 | 150 | ⅙ | Not soluble. |
| *Ex. 17BB* *Second Stage* Resin to EtO Molal Ratio 1:5 Ex. No. 140b | 7.6 | 13.15 | 1.85 | 7.6 | 13.15 | 9.35 | 5.2 | 9.00 | 6.40 | 2.4 | 4.15 | 2.95 | 80 | 177 | ⅙ | Somewhat soluble. |
| *Ex. 18BB* *Third Stage* Resin to EtO Molal Ratio 1:10 Ex. No. 141b | 4.22 | 6.98 | ------ | 4.22 | 6.98 | 10.0 | ------ | ------ | ------ | ------ | ------ | ------ | 90 | 165 | ½ | Soluble. |
| *Ex. 19BB* *Fourth Stage* Resin to EtO Molal Ratio 1:15 Ex. No. 142b | 3.76 | 6.24 | ------ | 3.76 | 6.24 | 13.25 | ------ | ------ | ------ | ------ | ------ | ------ | 100 | 171 | ½ | Very soluble. |
| *Ex. 20BB* *Fifth Stage* Resin to EtO Molal Ratio 1:20 Ex. No. 143b | 2.4 | 4.15 | 2.95 | 2.4 | 4.15 | 11.70 | ------ | ------ | ------ | ------ | ------ | ------ | 90 | 150 | ⅓ | Very soluble. |

Resin is 4AA. Reference to 89a and 139a is for comparison with Serial No. 74,474, filed Feb. 3, 1949. This is true also in regard to reference to Ex. 139b to 143b, inclusive. These 5 examples in the present case are, as noted, Examples 16BB thru 20BB, inclusive.

2,589,062

*Phenol for resin: Para-octyl phenol*     *Aldehyde for resin: Furfural*

Date, October 7–8, 1948

[Resin made on pilot plant size batch, approximately 25 pounds, corresponding to 42a with 206 parts by weight of commercial para-octylphenol replacing 164 parts by weight of para-tertiary amylphenol but this batch designated as 144a.]

| Resin 8AA | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 21BB* First Stage Resin to EtO Molal Ratio 1:1 Ex. No. 144b | 12.1 | 18.6 | ------ | 12.1 | 18.6 | 3.0 | 5.38 | 8.28 | 1.34 | 6.72 | 10.32 | 1.66 | 80 | 150 | ½ | Insoluble. |
| *Ex. 22BB* Second Stage Resin to EtO Molal Ratio 1:5 Ex. No. 145b | 9.25 | 14.25 | ------ | 9.25 | 14.25 | 11.0 | 3.73 | 5.73 | 4.44 | 5.52 | 8.52 | 6.56 | 100 | 177 | 5/12 | Slight tendency toward becoming soluble. |
| *Ex. 23BB* Third Stage Resin to EtO Molal Ratio 1:10 Ex. No. 146b | 6.72 | 10.32 | 1.66 | 6.72 | 10.32 | 14.91 | 4.97 | 7.62 | 11.01 | 1.75 | 2.70 | 3.90 | 85 | 182 | ¼ | Fairly soluble. |
| *Ex. 24BB* Fourth Stage Resin to EtO Molal Ratio 1:15 Ex. No. 147b | 5.52 | 8.52 | 6.56 | 5.52 | 8.52 | 19.81 | ------ | ------ | ------ | ------ | ------ | ------ | 100 | 176 | ½ | Readily soluble. |
| *Ex. 25BB* Fifth Stage Resin to EtO Molal Ratio 1:20 Ex. No. 148b | 1.75 | 2.70 | 3.90 | 1.75 | 2.70 | 8.4 | ------ | ------ | ------ | ------ | ------ | ------ | 80 | 160 | ¼ | Quite soluble. |

Resin is 8AA. Reference to 42a and 144a is for comparison with Serial No. 74,474, filed Feb. 3, 1949. This is true also in regard to reference to Ex. 144b through 148b, inclusive. These 5 examples in the present case are, as noted, Examples 21BB thru 25BB, inclusive.

*Phenol for resin: Para-phenyl phenol*     *Aldehyde for resin: Furfural*

Date, October 11–13, 1948

[Resin made on pilot plant size batch, approximately 25 pounds, corresponding to 42a with 170 parts by weight of commercial paraphenylphenol replacing 164 parts by weight of para-tertiary amylphenol but this batch designated as 149a.]

| Resin 9AA | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 26BB* First Stage Resin to EtO Molal Ratio 1:1 Ex. No. 149b | 13.9 | 16.7 | ------ | 13.9 | 16.7 | 3.0 | 3.50 | 4.25 | 0.80 | 10.35 | 12.45 | 2.20 | 100 | 160 | ½ | Insoluble. |
| *Ex. 27BB* Second Stage Resin to EtO Molal Ratio 1:5 Ex. No. 150b | 10.35 | 12.45 | 2.20 | 10.35 | 12.45 | 12.20 | 5.15 | 6.19 | 6.06 | 5.20 | 6.26 | 6.14 | 80 | 183 | ½ | Slight tendency toward solubility. |
| *Ex. 28BB* Third Stage Resin to EtO Molal Ratio 1:10 Ex. No. 151b | 8.90 | 10.7 | ------ | 8.90 | 10.70 | 19.0 | 5.30 | 6.38 | 11.32 | 3.60 | 4.32 | 7.68 | 90 | 193 | 7/12 | Fairly soluble. |
| *Ex. 29BB* Fourth Stage Resin to EtO Molal Ratio 1:15 Ex. No. 152b | 5.20 | 6.26 | 6.14 | 5.20 | 6.26 | 16.64 | ------ | ------ | ------ | ------ | ------ | ------ | 100 | 171 | ⅙ | Readily soluble. |
| *Ex. 30BB* Fifth Stage Resin to EtO Molal Ratio 1:20 Ex. No. 153b | 3.60 | 4.32 | 7.68 | 3.60 | 4.32 | 15.68 | Sample somewhat rubbery and gelatinous but fairly soluble | | | | | | 230 | 170 | 2 | |

Resin is 9AA. Reference to 42a and 149a is for comparison with Serial No. 74,474, filed Feb. 3, 1949. This is also true in regard to reference to Ex. 149b to 153b, inclusive. These 5 examples in the present case are, as noted, Examples 26BB thru 30BB, inclusive.

Attention is directed to the fact that the resins herein described must be fusible and soluble in a non-polar solvent, such as xylene, although obviously, they may be soluble and usually are, in other polar or oxygenated solvents, as previously noted. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation-susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even through cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature of structure of the resin polymer obtained varies somewhat with the conditions of reaction, the proportions of reactants, the nature of the catalyst, etc.

Having thus described our invention, what we claim as new and desire to secure by Letters Patent is:

1. Hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, low-stage phenol-furfural resin; said resin being derived by reaction between a difunctional monohydric phenol and furfural under alkaline conditions; said resin being formed in the substantial absence of phenols of functionality greater than two; said phenol being of the formula:

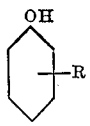

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. Hydrophile synthetic products; said hydrophile synthetic products being oxyalkylation-products of (A) ethylene oxide; and (B) an oxyalkylation-susceptible, fusible, organic solvent-soluble, water-insoluble, low-stage phenol-furfural resin; said resin being derived by reaction between a difunctional monohydric phenol and furfural under alkaline conditions; said resin being formed in the substantial absence of phenols of functionality greater than two; said phenol being of the formula:

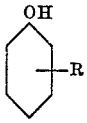

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

3. The product of claim 2, wherein R is an amyl radical.

4. The product of claim 2, wherein R is an octyl radical.

5. The product of claim 2, wherein R is a nonyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,501,015 | Wirtel | Mar. 21, 1950 |